United States Patent Office 3,822,171
Patented July 2, 1974

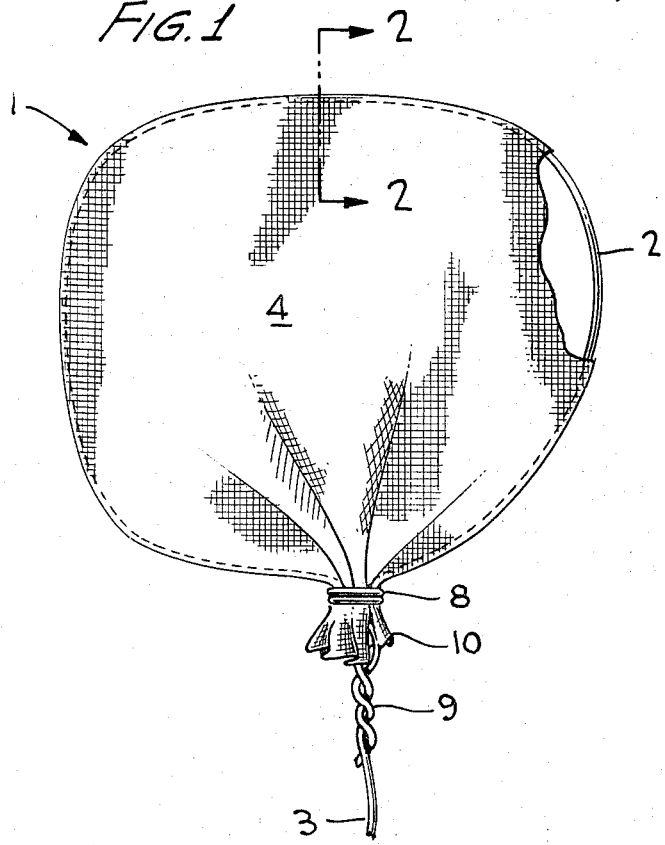
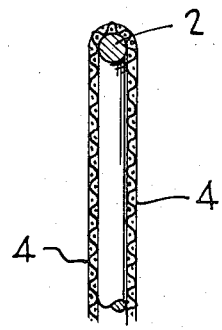
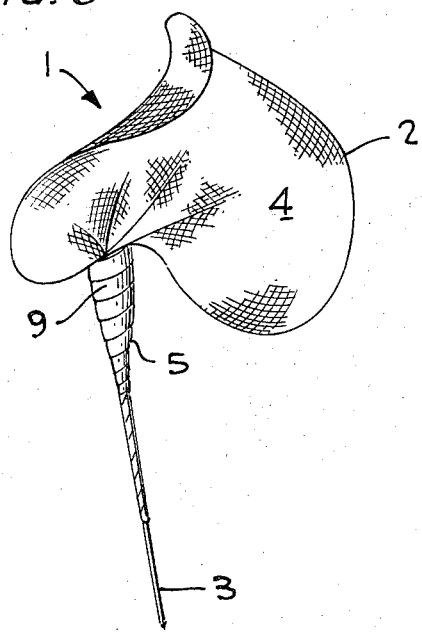
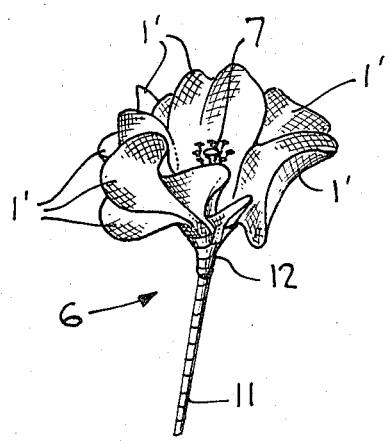

3,822,171
ARTIFICIAL FLOWER PETAL AND STEM
Rose M. Bouillot, Mas le Gres 13, Saint-Remy-de Provence, France
Filed Feb. 28, 1972, Ser. No. 229,676
Int. Cl. A41g 1/00
U.S. Cl. 161—29                                   1 Claim

ABSTRACT OF THE DISCLOSURE

An artificial flower comprising a plurality of flower members or petals, each member comprising a deformable support member having a generally straight section, a looped section and a base section joining the looped section to one end of the straight section; a stretchable material completely covering the looped section with the border of said material being gathered about the base section, and means for binding the border to the base section; and means for binding a plurality of artificial flower members together. The process comprises forming a plurality of flower members by shaping deformable strands to form a support member having a generally straight section, a looped section and a base section, covering the looped section with a stretchable covering material, gathering the border of this covering material about the base section, binding the border to the base section, deforming the support member so that the individual flower members resemble flower petals, assembling the plurality of flower members and binding the individual flower members together.

BACKGROUND OF THE INVENTION

Field of the Invention

The present invention relates to an improved artificial flower and method for making the same. More particularly, the present invention relates to an improved construction for individual artificial flower members which facilitates construction of the same.

Discussion of the Prior Art

While there have been many various artificial flowers and methods for producing the same, many of these artificial flowers are made from ceramic or hard plastic materials. While these artificial flowers are often attractive, they are somewhat difficult to produce since the individual flowers or petals must be completely shaped or molded and hardened before assembly so that the finished flower resembles real flowers since the individual petals cannot be shaped after assembly if necessary.

SUMMARY OF THE INVENTION

The present invention briefly comprises artificial flowers and flower members which resemble individual flower petals comprising a supporting member generally shaped into a loop, a stretchable covering material covering this loop and being attached to the base of the loop, and a plurality of these shaped flower members being assembled so as to form a finished artificial flower. The method for producing these flower members briefly comprises binding a supporting strand into a loop strand, covering the strand with a stretchable material and assembling a plurality of these covered elements to form an artificial flower.

It is, therefore, the primary object of the present invention to provide individual flower members which can be readily deformed so as to produce flower petals in any desired shape.

It is a further object of the present invention to provide an artificial flower which can be quickly and easily produced and which can be modified easily subsequent to assembly to suit the individual needs of the decorator.

It is a still further object of the present invention to provide a method for producing an artificial flower from a plurality of deformable flower petal members, each member being independent of other members.

It is a still further object of the present invention to provide an artificial flower wherein the petals have a light and airy appearance.

Still further objects and advantages of the artificial flower and process for producing the same will become apparent from the following description of the preferred embodiment taken in conjunction with the accompanying drawings.

BRIEF DESCRIPTION OF THE DRAWINGS

FIG. 1 is a front view of an individual flower member partially broken away and in an undeformed condition.

FIG. 2 is a view taken along line 2—2 of FIG. 1.

FIG. 3 is a perspective view of an individual flower member according to the present invention subsequent to deformation and assembly.

FIG. 4 is a perspective view of an artificial flower of the present invention produced by assembling a plurality of the members shown in FIG. 3.

DESCRIPTION OF THE PREFERRED EMBODIMENT

As shown in FIGS. 1 and 2, the support element comprises three sections, a looped section 2, a straight section 3, there two sections being joined together by a base section 9. Generally, the support element is formed from a single strand and at one end is bent into the shape of a loop and wound around the remaining straight section. The looped section 2 is then covered with a stretchable covering material 4. This covering material 4 is of such dimensions that the edges of this material 10 may be gathered together at base section 9 and held in place by any suitable means such as wire 8. By placing this stretchable covering material 4 over support loop section 2, a flower member or petal 1 is initially formed.

The deformable support may be any suitable lightweight strand-like material which is easily deformable yet which is sufficiently strong so as to maintain the deformed shape. This support material may be either a thin wire of any suitable ductile material such as annealed iron and may be either uncoated or coated with a protective varnish or plastic layer. The covering on the wire or strand element preferably is similar to the final color of the covering material 4.

Covering material 4 may be any suitable stretchable material, i.e. a woven or knit synthetic material which is sufficiently extensible or elastic so that it conforms to the shape of support loop 2. Although the preferred stretchable materials are circular knits of various synthetic yarns which have been texturized by false twisting, any covering material 4 which is sufficiently elastic or stretchable so that it conforms to the dimensions of the support loop may be utilized.

FIG. 3 shows a perspective view of an individual petal or flower element 1 subsequent to shaping. The covering material 4 which has been stretched over wire loop 2 is firmly held in place by a binding material 5 which may be any adhesive material such as florist tape which is wrapped around base section 9 and part of straight section 3. Subsequent to this, wire loop 2 is deformed to any desired shape such as that shown in FIG. 3 so that the finished flower members resemble an individual flower petal.

As shown in FIG. 4, which is a perspective view of a finished flower produced in accordance with the present invention, a plurality of flower members 1' are assembled and held in place by adhesive material 12 such as florist or floral tape. Furthermore, stem section 11, which is also covered by the binding of floral tape 12 may be a separate straight section of wire or similar support material or may be the composite of the straight support sections 3 from each flower element 1'. Furthermore, the artificial flower may be provided with a stamen section 7 surrounded by the various petal members and attached by means of the binding tape 12.

While the artificial flowers and individual elements and processes for producing the same in accordance with the present invention have been set forth by way of the foregoing specific embodiment, such embodiment is to be in no way limiting but should be construed as broadly as any and all equivalents in the appended claim.

What is claimed is:

1. An artificial flower petal and stem comprising
   (a) a flexible metal frame formed from a single flexible light-weight strand-like material having two end portions having
      (1) a closed loop portion intermediate said end portions and
      (2) a substantially straight stem portion connected to said closed loop portion; said stem portion formed from one of said two end portions and one end portion of said strand-like material being twisted at the point of closure of said loop about the second end portion forming said stem; and
   (b) an elastic knitted fabric bag formed from texturized synthetic yarns tautly stretched over said closed loop portion to completely or substantially completely cover said closed loop portion, the free edges of said elastic fabric bag gathered at said stem portion of said frame and secured to said frame in the vicinity of said connection between said stem portion and said closed loop.

References Cited

UNITED STATES PATENTS

| | | | |
|---|---|---|---|
| 921,246 | 5/1909 | Haskins | 161—30 |
| 1,439,539 | 12/1922 | Erman et al. | 161—29 |
| 1,942,174 | 1/1934 | Kaplan | 161—30 |
| 3,315,328 | 4/1967 | Ibrahim | 66—202 X |
| 3,423,924 | 1/1969 | Comer et al. | 57—157 |
| 2,075,327 | 3/1937 | Abrams et al. | 161—28 X |
| 1,831,559 | 11/1931 | Ham et al. | 161—28 X |
| 2,553,953 | 5/1951 | Arkinstall | 161—21 |
| 2,692,449 | 10/1954 | Jones | 161—28 |
| 3,150,462 | 9/1964 | Gallo | 47—55 |
| 543,252 | 7/1895 | Jones | 416—70 |
| 1,407,102 | 2/1922 | Viden | 15—210 R |
| 1,500,442 | 7/1924 | Cooper | 43—137 |
| 2,604,723 | 7/1952 | Bennett | 43—137 X |

GEORGE F. LESMES, Primary Examiner

H. F. EPSTEIN, Assistant Examiner

U.S. Cl. X.R.

156—61; 161—28